United States Patent
Dudar

(10) Patent No.: US 10,859,044 B2
(45) Date of Patent: Dec. 8, 2020

(54) METHODS AND SYSTEMS FOR REMOVING MOISTURE FROM ENGINE COMPONENTS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 15/814,666

(22) Filed: Nov. 16, 2017

(65) Prior Publication Data

US 2019/0145362 A1 May 16, 2019

(51) Int. Cl.
*F02M 35/10* (2006.01)

(52) U.S. Cl.
CPC ........ *F02M 35/10229* (2013.01); *F02M 35/10157* (2013.01); *F02M 35/10255* (2013.01); *F02M 35/10393* (2013.01)

(58) Field of Classification Search
CPC ....... F02M 35/10229; F02M 35/10255; F02M 35/10157; F02M 35/10393; F02D 41/0007; F02D 2200/0418
See application file for complete search history.

(56) References Cited

U.S. PATENT DOCUMENTS

| | | | |
|---|---|---|---|
| 6,688,104 B2 | 2/2004 | Baeuerle et al. | |
| 6,817,329 B2 * | 11/2004 | Buglione | B60K 6/48 123/179.3 |
| 7,530,336 B2 | 5/2009 | Brecheisen, II | |
| 8,439,019 B1 | 5/2013 | Carlson et al. | |
| 9,267,423 B2 * | 2/2016 | Russ | F02M 31/20 |
| 9,359,941 B2 | 6/2016 | Norman et al. | |
| 9,447,742 B2 * | 9/2016 | Styles | F02D 41/0005 |
| 10,465,615 B2 * | 11/2019 | Dudar | F01P 7/026 |
| 2002/0189256 A1 | 12/2002 | Kalish | |
| 2014/0048048 A1 | 2/2014 | Glugla et al. | |
| 2014/0100074 A1 | 4/2014 | Glugla | |
| 2014/0109568 A1 | 4/2014 | Glugla et al. | |
| 2014/0158089 A1 | 6/2014 | Glugla et al. | |
| 2015/0136076 A1 * | 5/2015 | Styles | B60W 20/00 123/325 |
| 2018/0163618 A1 * | 6/2018 | Sawai | B60W 20/50 |
| 2019/0203630 A1 * | 7/2019 | Dudar | F02D 41/0072 |

OTHER PUBLICATIONS

Dudar, A., "Methods and Systems for Reducing Water Accumulation in an Engine," U.S. Appl. No. 15/673,329, filed Aug. 9, 2017, 51 pages.

* cited by examiner

*Primary Examiner* — Grant Moubry
(74) *Attorney, Agent, or Firm* — Geoffrey Brumbaugh; McCoy Russell LLP

(57) ABSTRACT

Methods and systems are provided for removing moisture from engine intake manifold and exhaust manifold. In one example, a method may include, during an engine non-combusting condition, while the ambient humidity is higher than a threshold humidity, operating an intake electric booster to route pressurized air via each of the intake manifold and the exhaust manifold, thereby removing accumulated moisture from the engine components. The electric booster may also be operated immediately prior to an anticipated vehicle key-on event to remove condensate from engine components prior to an actual engine start.

16 Claims, 4 Drawing Sheets

METHODS AND SYSTEMS FOR REMOVING MOISTURE FROM ENGINE COMPONENTS

FIELD

The present description relates generally to methods and systems for removing moisture from engine intake manifold, exhaust manifold, and cylinders.

BACKGROUND/SUMMARY

Condensate accumulated in an engine intake may get ingested in the engine while the engine is combusting, thereby causing misfires. For example, moisture from humid air may condense on engine components such as the intake manifold and a charge air cooler and form a water puddle locally. Condensate accumulated in the intake manifold or in the charge air cooler (CAC) coupled to the intake manifold may be drawn into the engine cylinders along with intake air during engine operation, causing combustion instability.

Various approaches are provided for reducing occurrence of engine misfires due to ingestion of condensate. In one example approach shown in US 20140100074, Glugla et al. disclose a method to increase airflow through a charge air cooler (CAC) in order to purge condensate from the CAC. During an engine non-combusting condition, the transmission system is downshifted to a lower gear to increase engine speed and airflow via the CAC to purge stored condensate to the engine cylinders. By purging the condensate during an engine non-combusting condition, misfire events resulting from ingestion of water may be reduced.

However, the inventors herein have recognized potential disadvantages with the above approach. As one example, the approach may not be able to address condensate accumulated at one or more engine components prior to engine operation. The approach of Glugla purged CAC condensate which typically accumulates during boosted engine operation. The inventors have recognized that condensate may also accumulate in the engine when the engine is not operating. For example, during conditions when an engine is shutdown, such as during a vehicle key-off condition, or during hybrid vehicle propulsion using motor torque from a system battery, moisture from the ambient air may condense on and accumulate in the engine intake and exhaust manifolds. The amount of moisture accumulated may be a function of ambient conditions such as ambient humidity and ambient temperature. In particular, if the temperature of the air trapped inside the shutdown engine falls below a dew point temperature, moisture may start to accumulate in the engine. In one example, if the vehicle is parked in a region having elevated ambient humidity, when the intake air temperature falls below the dew point temperature, humid air may enter the intake manifold, engine cylinders, and the exhaust manifold via the intake throttle and/or the tailpipe, and condensate may collect therein. At key-on, when the engine is started and fuel is combusted in the engine cylinders, due to the condensate collected in the engine components, a duration of the cranking event may be prolonged. In addition, moisture in the exhaust manifold may increase the time required for an exhaust oxygen sensor to be functional, thereby causing the engine to operate under open loop control for a longer duration and emissions quality to be adversely affected. Further, water splashing on intake and/or exhaust oxygen sensor may result in inaccurate measurements by the sensor which may adversely affect determination of air-fuel ratio and t level of engine dilution desired. Further, moisture from the intake manifold may be drawn into the cylinder along with intake air. The moisture is then ingested in the cylinders, causing engine misfires and reducing combustion stability.

The inventors herein have recognized that the issues described above may be addressed by an engine method comprising: responsive to a higher than threshold ambient humidity, spinning an engine unfueled and operating an intake electric booster to route compressed air through an intake manifold and an exhaust manifold of the engine. In this way, when ambient humidity is high while the engine not combusting fuel, an electric booster may be operated to flow compressed air through the engine components and remove any accumulated moisture.

As one example, while an engine is not combusting fuel, such as during a vehicle key-off condition, during vehicle propulsion using motor torque, or during a deceleration fuel shut-off condition, ambient conditions may be monitored based on inputs from engine system sensors and/or from an external network communicatively coupled to the vehicle. For example, an ambient humidity may be measured and an engine intake manifold temperature may be monitored relative to a threshold temperature, such as a dew point temperature. If the vehicle is in a region with higher than threshold ambient humidity, while the intake air temperature is below the threshold temperature, air saturated with moisture may enter and condense in the engine components, degrading engine startability. The engine may be a boosted engine comprising a turbine driven intake air compressor and an electrically driven intake air compressor (herein also referred to as a battery operated electric booster) that is selectively operated for providing additional boost during increased torque demand. If condensate accumulation is determined during a vehicle key-off event, in anticipation of an upcoming engine-on event, an intake throttle of the engine may be fully opened, and the engine may be spun unfueled via a motor. Additionally, the electric booster may be operated to flow compressed air through the engine components including the intake manifold, the engine cylinders, and the exhaust passage. The increased flow of compressed air through the engine enables the accumulated moisture to be purged. Specifically, as a result of the compression, the temperature of the intake air increases, expediting the vaporization of the accumulated moisture, and thereby drying the engine components. Optionally, an exhaust gas recirculation (EGR) valve may be opened so that the compressed air may be routed from the intake manifold to the exhaust manifold via an EGR passage in addition to via the engine cylinders, thereby drying the engine cylinders and the exhaust manifold. Similarly, during a DFSO event or vehicle propulsion using machine torque, the electric booster may be opportunistically operated for drying engine components. The speed and duration of operation of the electric booster may be adjusted based on the determined amount of moisture collection. Once the moisture has been sufficiently removed, the engine may be started with improved combustion stability and reduce misfire occurrence.

In this way, by selectively operating an electric booster, moisture accumulated in engine components when an engine is not combusting may be effectively removed, thereby reducing the possibility of water ingestion in the engine cylinders during subsequent engine operation. As a result, misfire occurrence may be reduced. By using an existing electric booster for drying the engine intake manifold, exhaust manifold, and the engine cylinders, the need for additional components for condensate removal is removed. The technical effect of operating the electric booster for moisture removal prior to a vehicle start is that a drier engine may be cranked for a shorter duration, improving engine start times. By removing moisture from the exhaust manifold prior to engine start, heating of oxygen sensors may be expedited and closed loop control of engine fueling may be initiated earlier, improving fuel economy and emissions quality. Overall, by timely purging water accumulated in the intake manifold, exhaust manifold, and within engine cylinders during engine non-combusting conditions, combustion instability and misfire occurrence may be decreased when the engine resumes combustion.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 shows a flow chart illustrating an example method that can be implemented to remove moisture accumulated in engine components prior to vehicle key-on.

DETAILED DESCRIPTION

Figure 1:
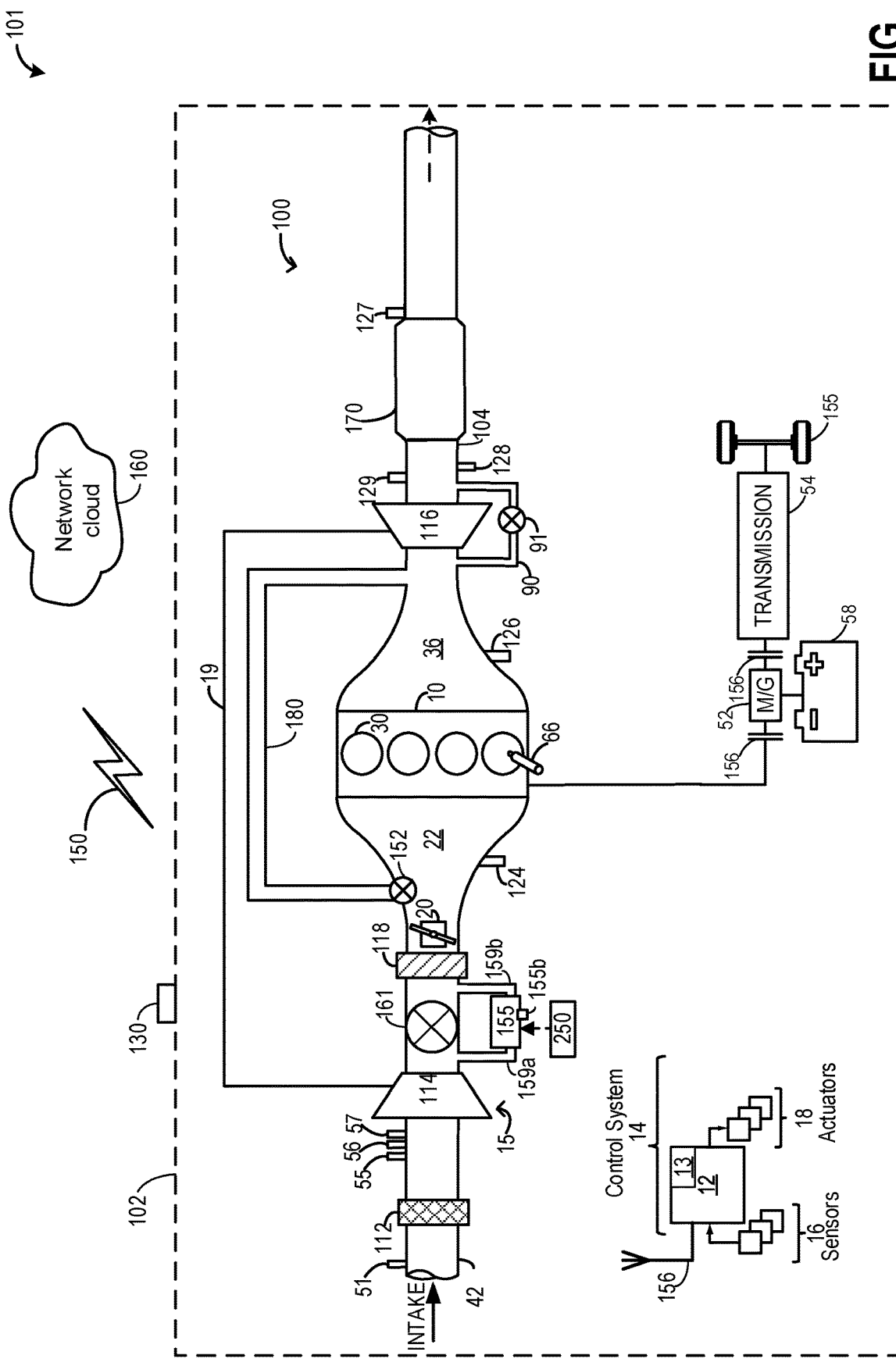
FIG. 1 shows an example engine system including an electric booster coupled to a hybrid vehicle.

The following description relates to systems and methods for removing moisture from engine components such as an engine intake manifold, exhaust manifold, and cylinders. As described with reference to an example engine system coupled to a hybrid vehicle system, as shown in FIG. 1, an electric booster may be operated to remove moisture accumulated in the engine components. An engine controller may be configured to perform a control routine, such as the example routine of FIG. 2, to remove moisture accumulated in engine components during engine non-combusting conditions. The controller may selectively operate the electric booster to remove moisture from the engine components before an engine is started, such as via the control routine of FIG. 3. An example electric booster operation that enables the removal of accumulated water is shown in FIG. 4.

FIG. 1 shows a schematic view 101 of a vehicle system 102 with an example engine system 100 including an engine 10. In one example, the engine system 100 may be a diesel engine system. In another example, the engine system 100 may be a gasoline engine system. In the depicted embodiment, engine 10 is a boosted engine coupled to a turbocharger 15 including a compressor 114 driven by a turbine 116. Specifically, fresh air is introduced along intake passage 42 into engine 10 via air cleaner 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 22. In the embodiment shown in FIG. 1, the pressure of the air charge within the intake manifold 22 is sensed by manifold air pressure (MAP) sensor 124. Temperature of ambient air entering the intake passage 42 may be estimated via an intake air temperature (IAT) sensor 51.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, an ambient humidity sensor 57 may be coupled to the inlet for estimating a humidity of aircharge entering the intake manifold. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator 91 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

To assist the turbocharger 15, an additional intake air compressor, herein also referred to as an electric booster 155 may be incorporated into the vehicle propulsion system. Electric booster 155 may be powered via an onboard energy storage device 250, which may comprise a battery, capacitor, supercapacitor, etc. The electric booster may include a compressor driven by an electric motor. A speed of operation of the electric booster may include adjusting a speed of operation of the electric motor, the electric motor operated via the on-board energy storage device 250.

In one example, electric booster 155 may be actuated in response to a demand for increased wheel torque, in order to provide the desired boost air rapidly to the engine while the turbocharger turbine spools up. As a result, the increased torque can be met without incurring the turbo lag which may otherwise have occurred if the assist from the electric booster was not available. In such an example, responsive to the turbocharger spooling up to a threshold speed (e.g. 70,000 rpm), the electric booster 155 may be actuated off, or deactivated. More specifically, operational control of the electric booster 155 may be achieved based on command signals (e.g. duty cycle or pulse width signals) received from the vehicle controller (e.g. controller 12). For example, the controller may send a signal to an electric booster actuator 155*b*, which may actuate on the electric booster. In another example, the controller may send a signal to the electric booster actuator 155*b*, which may actuate off the electric booster. In one example the electric booster actuator may comprise an electric motor which drives the compression of air.

Electric booster 155 may be positioned between a first electric booster conduit 159a, and a second electric booster conduit 159b. First electric booster conduit 159a may fluidically couple intake passage 42 to electric booster 155 upstream of electric booster bypass valve 161. Second electric booster conduit 159b may fluidically couple electric booster 155 to intake passage 42 downstream of electric booster bypass valve 161. As an example, air may be drawn into electric booster 155 via first electric booster conduit 159a upstream of electric booster bypass valve 161, and compressed air may exit electric booster 155 and be routed via second electric booster conduit to intake passage 42 downstream of electric booster bypass valve 161. In this way, compressed air may be routed to engine intake 22.

In circumstances where the electric booster 155 is activated to provide boost more rapidly than if the turbocharger 15 were solely relied upon, it may be understood that electric booster bypass valve 161 may be commanded closed while electric booster 155 is activated. In this way, intake air may flow through turbocharger 15 and through electric booster 155. Once the turbocharger reaches the threshold speed, the electric booster 155 may be turned off, and the electric booster bypass valve 161 may be commanded open.

The electric booster 155 may also be opportunistically operated responsive to condensate accumulation during an engine non-combusting condition to remove the condensate accumulated in the engine intake manifold 22, exhaust manifold 36, and combustion chambers (engine cylinders) 30. As the electric booster 155 is operated, compressed air may be routed via the intake manifold, the engine cylinders, and the exhaust manifold to remove any moisture accumulated in these engine components. The compressed air may be routed from the intake manifold to the exhaust manifold via one or more of the EGR passage 180 and the engine cylinders. A speed and duration of operation of the electric booster 155 may be based on each of a difference between a measured ambient humidity and the threshold ambient humidity, an engine temperature, and a condensate level of the charge air cooler. During a vehicle key-off condition, the electric booster 155 may also be operated to remove moisture from the engine components based on a predicted, upcoming engine start. The engine start may be predicted based on driving history retrieved from an on-board database 13. Details of the moisture removal method using the electric booster 155 is elaborated at FIGS. 2 and 3.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections may be directed to turbine 116 to drive the turbine. The combined flow from the turbine and the wastegate then flows through emission control device 170. In one example, the emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

Exhaust gas recirculation (EGR) delivery passage 180 may be coupled to the exhaust passage 104 upstream of turbine 116 to provide high pressure EGR (HP-EGR) to the engine intake manifold, downstream of compressor 114. An EGR valve 152 may be coupled to the EGR passage 181 at the junction of the EGR passage 180 and the intake passage 42. EGR valve 152 may be opened to admit a controlled amount of exhaust to the compressor outlet for desirable combustion and emissions control performance. EGR valve 152 may be configured as a continuously variable valve or as an on/off valve. In further embodiments, the engine system may include a low pressure EGR (LP-EGR) flow path wherein exhaust gas is drawn from downstream of turbine 116 and recirculated to the engine intake manifold, upstream of compressor 114.

One or more sensors may be coupled to EGR passage 180 for providing details regarding the composition and condition of the EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors coupled to the compressor inlet.

A plurality of sensors, including an exhaust temperature sensor 128, an exhaust oxygen sensor, an exhaust flow sensor, and exhaust pressure sensor 129 may be coupled to the main exhaust passage 104. The oxygen sensor may be linear oxygen sensors or UEGO (universal or wide-range exhaust gas oxygen), two-state oxygen sensors or EGO, HEGO (heated EGO), a NOx, HC, or CO sensors.

Engine system 100 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust pressure sensor 129, compressor inlet temperature sensor 55, compressor inlet pressure sensor 56, ambient humidity sensor 57, IAT sensor 51, engine coolant temperature sensor, and EGR sensor. Other sensors such as additional pressure, temperature, air/fuel ratio, and composition sensors may be coupled to various locations in engine system 100. In addition, sensors coupled to the exterior of the vehicle system such as the rain sensor (windshield sensor) 130 may be used to estimate ambient humidity.

The actuators 18 may include, for example, electric booster bypass valve 161, throttle 20, electric booster actuator 155b, EGR valve 152, wastegate actuator 91, and fuel injector 66. The control system 14 may include a controller 12. The controller 12 may receive input data from the various sensors, process the input data, and trigger various actuators in response to the processed input data based on instruction or code programmed therein corresponding to one or more routines. In one example, in response to a higher than threshold ambient humidity condition as determined based on the input from the ambient humidity sensor 57 and a lower than threshold ambient temperature as determined based on the input from the IAT sensor 51, during a vehicle key-off condition, upon anticipation of a vehicle key-on event, the controller 12 may send a signal to each of the electric booster bypass valve 161 to actuate the valve to a closed position, and to the booster actuator 155b to actuate the electric booster 155 to flow compressed air via the intake manifold to remove accumulated condensate from the intake manifold.

The controller 12 may be coupled to a wireless communication device 156 for direct communication of the vehicle 102 with a network cloud 160. Using the wireless communication 150 via the device 156, the vehicle 102 may retrieve data regarding current and/or upcoming ambient conditions (such as ambient humidity, temperature, pressure, etc.) from the network cloud 160. At completion of a drive cycle, the database 13 within the controller 12 may be updated with route information including driver behavioral data, engine operating conditions, date and time information, and traffic information. Furthermore, in some examples, controller may be in communication with a remote engine start receiver (or transceiver) that receives wireless signals from a key fob having a remote start button, the remote start button actuated by a vehicle operator from a location that is remote from the vehicle location. In other examples (not shown), a remote engine start may be initiated via a cellular telephone, or smartphone based system where a user's cellular telephone sends data to a server and the server communicates with the vehicle to start the engine.

In some examples, vehicle 102 may be a hybrid vehicle with multiple sources of torque available to one or more vehicle wheels 155. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft of engine 10 and electric machine 52 are connected via a transmission 46 to vehicle wheels 155 when one or more clutches 156 are engaged. In the depicted example, a first clutch 156 is provided between crankshaft and electric machine 52, and a second clutch 156 is provided between electric machine 52 and transmission 46. Controller 12 may send a signal to an actuator of each clutch 156 to engage or disengage the clutch, so as to connect or disconnect crankshaft from electric machine 52 and the components connected thereto, and/or connect or disconnect electric machine 52 from transmission 46 and the components connected thereto. Transmission 46 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge traction battery 58, for example during a braking operation.

In this way, the components of FIG. 1 enable a system for a hybrid vehicle comprising: a vehicle, an electric machine coupled to a battery for propelling the vehicle, an engine including one or more cylinders, an intake manifold, and an exhaust manifold, an intake passage including a compressor, a charge air cooler (CAC) downstream of the compressor, and an intake throttle downstream of the CAC, a conduit coupled to the intake passage downstream of the compressor and upstream of the CAC, the conduit including a motor-driven electric booster, an electric booster bypass valve coupled at a junction of the intake passage and the conduit, an accelerator pedal for receiving an operator torque demand, one or more sensors including each of an ambient humidity sensor and an intake air temperature sensor coupled to the intake manifold, and a rain sensor coupled to a vehicle windshield wiper, an exhaust gas recirculation (EGR) passage coupling the exhaust manifold to the intake manifold, downstream of the compressor, the EGR passage including an EGR valve. The system further includes a controller with computer readable instructions stored on non-transitory memory for: operating the engine in a first mode with the engine spinning fueled and an output of the electric booster adjusted based on torque demand, and operating the engine in a second mode with the engine spinning unfueled and the output of the electric booster adjusted based at least on ambient humidity.

Figure 2:
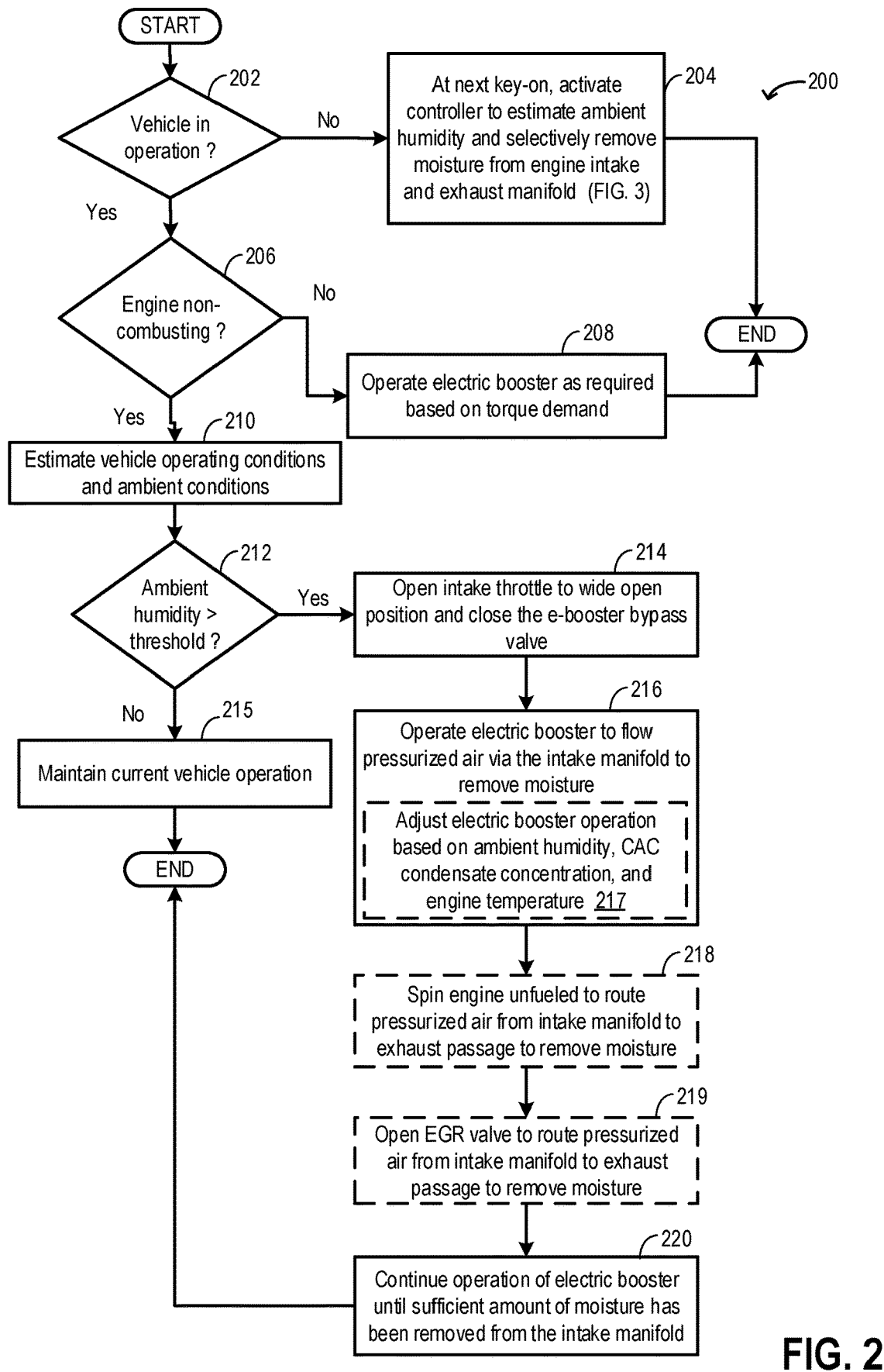
FIG. 2 shows a flow chart illustrating an example method that can be implemented to remove moisture accumulated in engine components during an engine non-combusting condition.

FIG. 2 shows an example method 200 that can be implemented to remove moisture accumulated in engine components during an engine non-combusting condition. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the routine includes determining if the vehicle is in operation (being propelled). The vehicle may be determined to be operational when the vehicle is in a key-on condition. In one example, it may be determined if the vehicle is being propelled using engine torque and/or motor torque. In another example, it may be determined if the vehicle is idle-stopped or operating in a declaration fuel shut-off condition. As such, during vehicle operation, the engine may or may not be combusting fuel and air.

If it is determined that the vehicle is being operated, at 206, the routine includes determining if the engine is in a non-combusting condition. An engine non-combusting condition may include an engine idle-stop condition, a deceleration fuel shut-off (DFSO) condition, and an engine shut-down event. For example, engine combustion may be suspended when one or more idle-stop conditions are met. As an example, engine idle-stop conditions may include, engine idling for a longer than threshold duration (such as at a traffic stop), a greater then threshold (such as at least more that 30% charged) state of charge (SOC) of the battery coupled to the electric machine, the air conditioner not issuing a request for restarting the engine (as may be requested if air conditioning is desired). Also, if the vehicle speed is lower than a threshold (e.g., 3 mph) an engine ide-stop may be requested even if the vehicle is not at rest. Further, prior to an engine idle-stop, an emission control device coupled to the exhaust manifold of engine may be analyzed to determine that no request for engine restart was made.

As another example, during a DFSO condition, fuel injection to the engine cylinders may be suspended while cylinder valves continue to operate and pump air through the cylinder, and the engine continues to spin. In one example, the DFSO condition may be in response to an accelerator pedal tip-out (that is, where the operator has released an accelerator pedal and requested a decrease in torque), such as when the vehicle may be coasting.

As yet another example, the engine may be non-combusting and held shut-down when the vehicle is propelled using only motor torque from an electric machine (such as electric machine 52 in FIG. 1) of the hybrid electric vehicle (HEV). The vehicle may be propelled via motor torque during lower than threshold engine load conditions and higher than threshold SOC of the electric machine battery. The threshold engine load may be calibrated based on vehicle operating conditions including vehicle speed and the battery SOC. The threshold SOC may correspond to a minimum motor power desired to propel the vehicle.

If it is determined that the engine is combusting fuel in engine cylinders, at 208, current engine operation may be maintained and an electric booster (such as electric booster 155 in FIG. 1) may be operated as required to provide boost assist during an increased torque demand. The electric booster may be coupled to a conduit parallel to an intake passage, the conduit coupled to the intake passage downstream of an intake compressor and upstream of a charge air cooler. During conditions when the boost pressure provided by operating the turbocharger (such as intake compressor 114 and exhaust turbine 116 in FIG. 1) is lower than a desired boost pressure, the electric booster may be operated using energy from an onboard energy storage device (such as energy storage device 250 in FIG. 1) to provide the desired boost. The speed and duration of operation of the electric booster may be adjusted based on turbocharger speed, and torque demand as estimated via a pedal position sensor. In one example, the speed and duration of operation of the electric booster may be increased with an increase in the torque demand and a decrease in turbocharger speed. In another example, the speed and duration of operation of the electric booster may be decreased with a decrease in the torque demand and an increase in turbocharger speed.

If it is determined that the engine is in a non-combusting condition, at 210, current vehicle and engine operating conditions may be estimated and/or measured. These may include, for example, operator torque demand, vehicle speed, engine temperature, exhaust temperature, manifold pressure, manifold air flow, battery state of charge, etc. In addition, ambient conditions such as ambient humidity, temperature, and barometric pressure may be estimated. In one example, ambient humidity may be measured via one or more of an intake humidity sensor (such as humidity sensor 57 in FIG. 1) and a windshield humidity sensor (such as rain sensor 130 in FIG. 1). Ambient humidity conditions at a current vehicle location may be obtained from weather data, as retrieved from an external network (such as network cloud 160 in FIG. 1) communicatively coupled to the vehicle via wireless communication (such as wireless communication 150 in FIG. 2).

At 212, the routine includes determining if the ambient humidity is higher than a threshold humidity. The controller may calibrate the threshold ambient humidity based on an estimated dew point temperature. The estimated dew point temperature may be based on measured ambient humidity and the engine intake manifold temperature. The controller may determine the dew point temperature based on a calculation using a look-up table with the input being each of the ambient humidity and the engine intake manifold temperature and the output being the dew point temperature. The controller may determine the engine intake manifold temperature based on input from an intake air temperature sensor (such as intake temperature sensor 51 In FIG. 1) and an engine coolant temperature sensor coupled to an engine coolant system. In one example, the threshold is a non-zero threshold wherein the threshold humidity corresponds to a humidity level above which moisture from air may condense and accumulate in the engine, on engine components. In another example, the threshold relative humidity level is 50%.

If it is determined that the current ambient humidity is below the threshold humidity, it may be inferred that at the lower than threshold ambient humidity, condensate is not likely form in the engine components. Therefore, at 215, current vehicle operation may be maintained at nominal settings without operation of the electric booster for removal of condensate from the engine components.

If it is determined that the engine is non-combusting, it may be inferred that engine temperature may drop lower than the dew point temperature (as heat from combustion is lost to the atmosphere) and moisture in air entering the intake manifold via an at least partially open intake throttle may condense locally at the engine intake manifold. Also, during a lower than threshold ambient air temperature as estimated based on inputs from an intake air temperature (such as IAT sensor 51 in FIG. 1), moisture in air entering the intake manifold may condense at the engine intake manifold. Humid air may be trapped inside the engine intake manifold and engine cylinders at engine shut-down. The amount of air trapped may be a function of the throttle opening and cylinder valve positions. As the engine cools down, water from the trapped air may condense on the engine components. Further, due to degradation of the intake passage and/or the throttle, there may be an opening (such as a leak) in a portion of the intake manifold which allows fluidic communication between the intake manifold and the atmosphere. Humid air may enter the engine system through such an opening even when the engine is not combusting and a water puddle may be formed in the intake manifold. If one or more engine valves are also open at this time (such as due to the engine stopping position during the engine shutdown being a position where the intake valve or the exhaust valve of a cylinder is open), humid air may enter the engine cylinders. The temperature of engine cylinder walls may also decrease during the engine non-combusting condition due to the heat generated during engine operation being lost to the atmosphere, thereby allowing moisture condensation inside the engine cylinders.

At 214, the controller may send a signal to an actuator coupled to the intake throttle to open the throttle to a wide open position to allow ambient air to enter the engine intake manifold which may then be pressurized and routed via the engine intake manifold, engine cylinders, and engine exhaust manifold to remove any accumulated moisture. The controller may also send a signal to an actuator coupled to an electric booster bypass valve to actuate the electric booster bypass valve to a completely closed position. By closing the electric booster bypass valve, the entire volume of air entering the intake passage via the throttle may flow via the electric booster coupled between a first electric booster conduit (such as first conduit 159a in FIG. 1) and a second electric booster conduit (such as first conduit 159b in FIG. 1), parallel to the intake passage.

At 216, the electric booster may be operated to flow pressurized air via the intake manifold to remove moisture. The controller may send a signal to the electric booster actuator (such as actuator 155b in FIG. 1) to actuate the electric booster using energy from the energy storage device coupled to the electric booster. As the ambient air entering the intake manifold via the wide open throttle flows through the electric booster, the air is pressurized (compressed). Due to pressurization of air, the temperature of the air may increase. As the compressed air at an elevated temperature flows through the intake manifold, the moisture condensed in the intake manifold may vaporize. In addition, the condensate may be carried with the flowing air out of the intake manifold. The water vapor may then be removed from the intake manifold with the pressurized air stream. The pressurized air may also remove any condensate accumulated in a charge air cooler (CAC) coupled to the intake manifold, downstream of the electric booster. In this way, moisture condensed in the intake manifold may be removed, thereby drying the intake manifold prior to a subsequent engine combustion event and reducing the possibility of water ingestion during combustion.

Operating the electric booster may include, at 217, adjusting a speed and duration of operation of the electric booster based on ambient humidity, CAC condensate concentration, and engine temperature. The CAC condensate concentration may be estimated based on one or more of a duration and speed of operation of the intake compressor and the CAC prior to engine shut-down, ambient humidity, and engine operating conditions including engine temperature immediately prior to the engine shut-down. The amount of moisture to be removed from the engine components may be directly proportional to the ambient humidity and CAC condensate concentration and the amount of moisture to be removed from the engine components may be inversely proportional to engine temperature. With an increase in ambient humidity above the threshold humidity, there is an increase in the moisture content of ambient air resulting in a corresponding increase in condensate formation within engine components. During engine operation, the air compressed by the intake compressor may be cooled as it flows via the CAC. While cooling the air, moisture from the compressed air may condense and saturate a filter of the CAC. The condensate may be periodically and/or opportunistically removed from the CAC to reduce the possibility of water ingestion into the engine cylinders. The engine temperature may remain elevated such as higher than the dew point temperature immediately after engine shut-down and the elevated temperature may reduce the possibility of condensate formation.

The operation of the electric booster includes a speed of rotation of an electrically operated compressor and a duration of operation of the electric booster. As the speed of rotation of the compressor increases, a larger amount of air may be compressed and routed via the intake manifold, thereby facilitating removal of a higher amount of moisture from the intake manifold. As the duration of operation of the compressor increases, the process of removal of moisture from the engine components may be prolonged, thereby drying the engine components to a greater extent. The controller may determine a speed of operation of the motor driving the electric booster and a duration of operation of the motor based on each of a difference between ambient humidity and the threshold humidity, CAC condensate concentration, and engine temperature. In one example, the speed of operation of the motor and/or the duration of operation of the motor may be increased with an increase in one or more of the difference between ambient humidity and the threshold humidity and the CAC condensate concentration, and a decrease in engine temperature. In another example, the speed of operation of the motor and/or the duration of operation of the motor may be decreased with a decrease in one or more of the difference between ambient humidity and the threshold humidity and the CAC condensate concentration, and an increase in engine temperature. The controller may determine each of the speed of operation of the motor and the duration of operation of the motor based on a calculation using a look-up table with the input being each of the difference between ambient humidity and the threshold humidity, the CAC condensate concentration, and the engine temperature and the output being speed of operation of the motor and the duration of operation. The controller may also make a logical determination (e.g., regarding a speed of operation of the motor and/or the duration of operation) based on logic rules that are a function of each of the difference between ambient humidity and the threshold humidity, the CAC condensate concentration, and the engine temperature. The controller may then generate a control signal that is sent to the electric booster actuator. Increasing includes commanding a signal with a higher duty cycle or pulse-width to the actuator of the electric booster. At 218, the routine includes spinning the engine unfueled via an electric machine (such as electric machine 52 in FIG. 1) using motor torque. The controller may send a signal to the actuator of the electric motor to start spinning the engine at an idling speed, such as at or around 400 rpm. Due to the low pressure created in the combustion chambers from spinning the engine, the pressurized air from the intake manifold may be routed to the exhaust passage via the engine cylinders. The air may enter each engine cylinder via the respective intake valve and exit the cylinder via the respective exhaust valve. As the pressurized air having an elevated temperature flows through the engine cylinders, any moisture trapped within the engine cylinders may be vaporized and removed along with the air stream, thereby drying the cylinders. Further, spinning the engine may result in frictional loss of energy which may be converted to thermal energy. The thermal energy may further facilitate in removal of moisture from the engine cylinders. After flowing through the engine cylinders, the pressurized air may be routed to the atmosphere via the exhaust passage and the tailpipe. Due to humid air entering the exhaust passage via the tailpipe, moisture may accumulate in the exhaust passage and enter an exhaust after treatment device. Upon a subsequent engine start, due to the moisture accumulated in the exhaust after treatment device, it may take longer for the exhaust after treatment device to attain the light-off temperature, thereby adversely affecting emissions quality. While flowing through the exhaust passage, the moisture accumulated in the exhaust passage may also be removed to the atmosphere along with the air stream, thereby drying the exhaust passage and the exhaust after treatment device.

During conditions such as a lower than threshold state of charge of the battery powering the electric machine used for spinning the engine, the engine may not be rotated and an alternate route may be used to flow the pressurized air from the intake manifold to the exhaust passage. In one example, at 219, an exhaust gas recirculation (EGR) valve (such as EGR valve 152 in FIG. 1) coupled to an EGR passage (such as EGR passage 180 in FIG. 1) coupling the exhaust manifold to the intake manifold may be opened to route pressurized air from the intake manifold to the exhaust passage via the EGR passage. As the EGR passage is coupled to the intake manifold downstream of the electric booster and the CAC, the pressurized air exiting the electric booster may flow to the exhaust passage via the EGR passage. As the pressurized air at an elevated temperature flows through the exhaust passage and the exhaust after treatment device housed in the exhaust passage, the moisture accumulated in the exhaust passage may also be removed to the atmosphere along with the air stream, thereby drying the exhaust passage and the exhaust after treatment device. In this way, responsive to a higher than threshold ambient humidity during an engine non-combusting condition, an EGR valve may be opened and an intake electric booster may be operated to route compressed air through an intake manifold and an exhaust manifold of the engine via an EGR passage without spinning the engine (fueled or unfueled).

In one example, the engine may be rotated unfueled while maintaining the EGR valve in an open position to route pressurized air from the intake manifold to the exhaust manifold via each of the engine cylinders and the EGR passage.

At 220, the electric booster may be continued to be operated until sufficient amount of moisture has been removed from the intake manifold. As an example, the controller may determine if sufficient amount of moisture has been removed based on ambient humidity and duration of operation of the electric booster. It may be inferred that sufficient amount of moisture has been removed if the electric booster has been operated for a specific duration and/or if the ambient humidity has decreased to below the threshold humidity such that further condensation of moisture from ambient air may reduce. The specific duration of operation of the electric booster is determined in step 217 based on each of a difference between ambient humidity and the threshold humidity, CAC condensate concentration, and engine temperature. The controller may also determine if sufficient moisture has been removed from the engine system based on engine temperature. As such, if combustion is resumed, the engine temperature may increase to above a threshold temperature and at the higher than threshold engine temperature, the moisture accumulated in the intake manifold may vaporize, thereby drying the intake manifold. The threshold engine temperature may be calibrated based on dew point temperature and boiling point of water. In another example, operation of the electric booster for moisture removal may be discontinued at engine start as during engine operation, the electric booster may be opportunistically used for providing the desired boost pressure.

Returning to step 202, if it is determined that the vehicle is not operational, it may be inferred that the vehicle is at rest and is not being propelled using engine torque and/or motor torque. When the vehicle is at rest, it may be parked in an engine-off condition. The engine temperature may drop lower than the dew point temperature and moisture contained in ambient air may condense on the cooler engine components. Upon subsequent engine operation, due to the moisture accumulated in the engine components, it may take a prolonged duration for the engine to crank, thereby increasing loss of battery power, and also adversely affecting driving experience. Further, the accumulated moisture within the intake manifold and cylinders may be ingested when the engine is operated, and may cause an engine misfire. Also, moisture accumulated in the exhaust manifold may adversely affect emissions quality during a subsequent engine start.

Therefore at 204, at next key-on, upon anticipation of an engine start, the controller may be awaken from a sleep mode (activated) to estimate ambient humidity and to selectively remove moisture from engine intake and exhaust manifold. Selective removal of moisture includes removal of moisture from the engine components in response to the ambient humidity being higher than a threshold humidity. Details of the moisture removal method is elaborated in FIG. 3. If it is determined that the ambient humidity is lower than the threshold humidity, it may be inferred that there has not been significant accumulation of condensate in the engine components and removal of moisture immediately prior to the subsequent engine start may not be desired.

In this way, the electric booster in the engine may be operated in a first mode responsive to the torque demand being higher than a threshold while operating a compressor, and the electric booster in the engine may be operated in a second mode responsive to the ambient humidity being higher than a threshold humidity. Electric booster operation may be transitioned from the first mode to the second mode responsive to each of a suspension of fuel injection to the one or more engine cylinders, a decrease in engine temperature to below a threshold temperature, and an increase in ambient humidity to above a threshold humidity, wherein each of the threshold humidity and the threshold temperature is calibrated based on an estimated dew point temperature. In addition, for an engine (such as a diesel engine) equipped with glow plugs, during engine non-combusting conditions, responsive to higher than threshold humidity conditions, the glow plugs may be activated to heat the engine intake manifold. By heating the engine intake manifold, evaporation of the accumulated condensate may be expedited and further condensate formation may be reduced.

Figure 3:
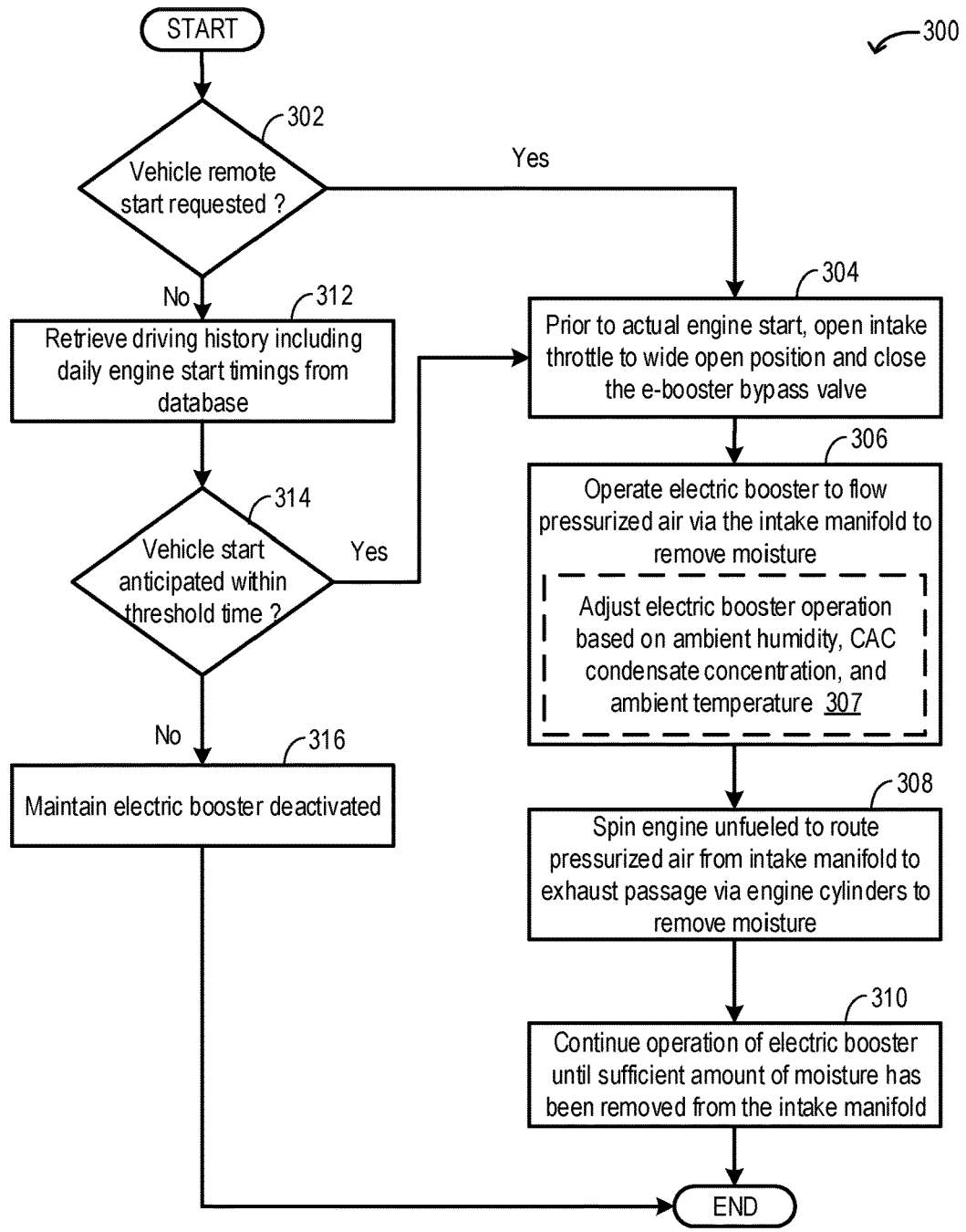
Figure 4:
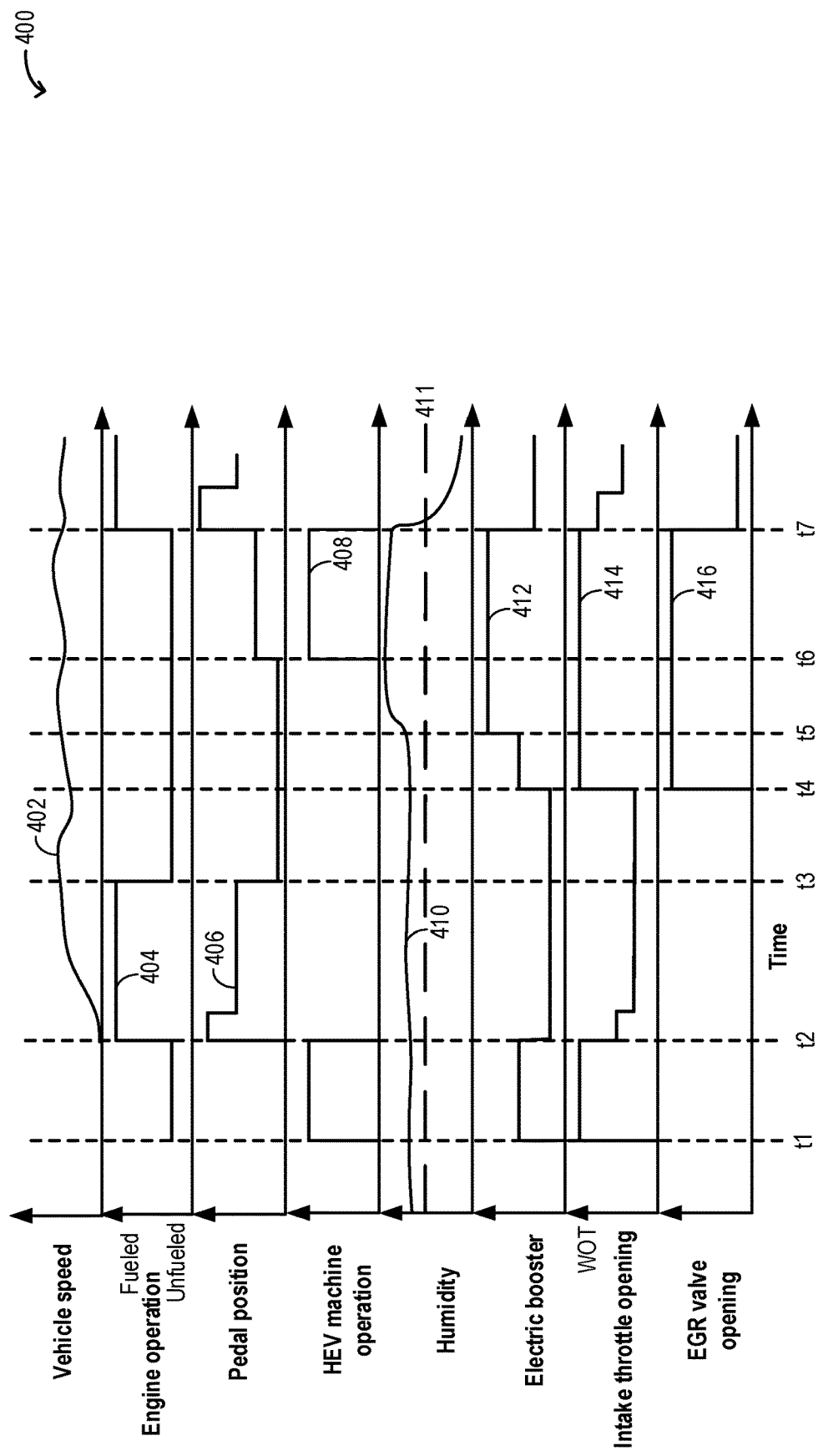
FIG. 4 shows an example operation of the electric booster for moisture removal from the engine components, according to the present disclosure.

FIG. 3 shows an example method 300 for moving moisture accumulated in engine components of a stationary vehicle, prior to vehicle key-on during a higher than threshold ambient humidity condition. Method 300 may be a part of method 200 and may be carried out, for example, in step 210 of the method 200.

At 302, the routine includes determining if a vehicle remote start has been requested. A remote start may be confirmed responsive to a vehicle key-on signal received from a source external to the vehicle. In one example, the operator may remotely request an engine start such that vehicle cabin heating may be initiated and the cabin reaches a desired temperature before the operator enters the cabin and starts driving the vehicle. In another example, such as where the vehicle has at least some autonomous functionality, in response to a request for a remote vehicle start, the electric machine may be operated to attain the desired cabin temperature and then the vehicle may be propelled using machine torque and/or engine torque. In yet another example, an operator of an autonomous vehicle may initiate vehicle operation (propulsion) from a remote location using wireless communication. The vehicle may be communicatively coupled to an external source such as a key fob, a cellular phone, or a smart phone used for remote engine start via wireless communication. Based on the signal received from the remote source, the controller may schedule the engine start at a requested time. The engine start time may be determined based on the remote start request. For example, the engine may be started after a duration since the remote start request is received, the duration based on the cabin heating request, as well as any other auxiliary requests (e.g., entertainment system operation, navigation system operation) received from the operator (or predefined based on operator settings).

If it is determined that a remote vehicle start has not been requested, at 312, driving history of the vehicle may be retrieved from the database (such as database 13 in FIG. 1). The controller may also retrieve date, time, and location information (such as global positioning system coordinates) of the vehicle from a network cloud (such as network cloud 160 in FIG. 1) using wireless communication. In one example, if the vehicle is parked at a first location (such as a garage in the operator's house), based on the drive history, it may be known that the vehicle is operated at a particular time (e.g., at 8 a.m.) from the first location to a second location (e.g., to a parking garage at the operator's office) each weekday of the week and the vehicle may be operated at a different time and to a different, third location during weekends. If the vehicle is parked at the first location, based on the retrieved driving history, the location of the vehicle, date and time information, prior to an actual engine start, the controller may predict an upcoming vehicle key-on event and an engine start event at a certain time of the day.

At 314, the routine includes determining if a vehicle start is anticipated within a threshold amount of time. The threshold time may be determined based on an estimated duration required for removal of moisture accumulated in the engine components. As an example, with an increase in the amount of moisture accumulated in the engine components, the time required for removal of the accumulated moisture may increase. The controller may determine the time required for removal of the moisture and consequently the threshold time based on each of an ambient humidity, CAC condensate concentration, and engine temperature. The controller may determine the threshold time based on a calculation using a look-up table with the input being each of the ambient humidity, the CAC condensate concentration, and the engine temperature, and the output being the threshold time. For example, if the duration required for removal of the moisture is 3 minutes, the threshold time may be set to be 4 minutes such that a substantial amount of moisture may be removed prior to the actual engine start.

If it is determined that a vehicle start is not anticipated within the threshold time, removal of moisture from the engine components may be postponed, and at 316 the electric booster may be maintained in a deactivated state.

If it is determined that a vehicle start is anticipated within the threshold time, at 304, prior to the actual engine start, the controller may send a signal to an actuator coupled to the intake throttle to open the throttle to a wide open position to allow ambient air to enter the engine intake manifold which may be pressurized and routed through the engine intake manifold, engine cylinders, and engine exhaust manifold to remove any accumulated moisture. The controller may also send a signal to an actuator coupled to an electric booster bypass valve to actuate the electric booster bypass valve to a completely closed position. By closing the electric booster bypass valve, the entire volume of air entering the intake passage via the throttle may flow to the CAC via the electric booster. Also, if it is determined at step 302 that a vehicle remote start has been requested the routine may directly proceed to step 304.

At 306, the electric booster may be operated to flow pressurized air via the intake manifold to remove moisture. The controller may send a signal to the electric booster actuator (such as actuator 155b in FIG. 1) to actuate the electric booster using energy from the energy storage device coupled to the electric booster. As the ambient air entering the intake manifold via the wide open throttle flows through the electric booster, the air is pressurized (compressed) and the temperature of the air may increase. As the compressed air at an elevated temperature flows via the intake manifold, the moisture condensed in the intake manifold may vaporize. The water vapor may then be removed from the intake manifold with the pressurized air stream. The pressurized air may also remove any condensate accumulated in a charge air cooler (CAC) coupled to the intake manifold downstream of the electric booster. In this way, moisture condensed in the intake manifold may be removed, thereby drying the intake manifold prior to the upcoming engine operation, thereby reducing the possibility of water ingestion during combustion.

Operating the electric booster may include at 307, adjusting the operation of the electric booster based on ambient humidity, CAC condensate concentration, and engine temperature. The amount of moisture to be removed from the engine components may be directly proportional to the ambient humidity and CAC condensate concentration and the amount of moisture to be removed from the engine components may be inversely proportional to engine temperature.

The operation of the electric booster includes a speed of rotation of the electric booster and a duration of operation of the electric booster. The controller may determine a speed of operation of the motor driving the electric booster and a duration of operation of the motor based on each of a difference between ambient humidity and the threshold humidity, CAC condensate concentration, and ambient temperature. In one example, the speed of operation of the motor and/or the duration of operation of the motor may be increased with an increase in one or more of the difference between ambient humidity and the threshold humidity and the CAC condensate concentration, and a decrease in ambient temperature. The controller may determine each of the speed of operation of the motor and the duration of operation of the motor based on a calculation using a look-up table with the input being each of the difference between ambient humidity and the threshold humidity, the CAC condensate concentration, and the ambient temperature and the output being speed of operation of the motor and the duration of operation. The controller may also make a logical determination (e.g., regarding a speed of operation of the motor and/or the duration of operation) based on logic rules that are a function of each of the difference between ambient humidity and the threshold humidity, the CAC condensate concentration, and the ambient temperature. The controller may then generate a control signal that is sent to the electric booster actuator.

At 308, the routine includes spinning the engine unfueled via an electric machine (such as electric machine 52 in FIG. 1) using motor torque. The controller may send a signal to the actuator of the electric motor to start spinning the engine at an idling speed, such as at or around 400 rpm. Due to the lower pressure created from spinning the engine, the pressurized air from the intake manifold may be routed to the exhaust passage via the engine cylinders. The air may enter the engine cylinders via respective intake valves and exit the cylinders via respective exhaust valves. As the pressurized air having an elevated temperature flows through the engine cylinders, any moisture trapped within the engine cylinders may be vaporized and removed along with the air stream, thereby drying the cylinders. After flowing through the engine cylinders, the pressurized air may be routed to the atmosphere via the exhaust passage and the tailpipe. While flowing through the exhaust passage, the moisture accumulated in the exhaust passage may also be removed to the atmosphere along with the air stream, thereby drying the exhaust passage and the exhaust after treatment device. In one example, an exhaust gas recirculation (EGR) valve (such as EGR valve 152 in FIG. 1) coupled to an EGR passage (such as EGR passage 180 in FIG. 1) may be opened to route from the intake manifold may be routed to the exhaust passage via the EGR passage.

At 310, the electric booster may be continued to be operated until sufficient amount of moisture has been removed from the intake manifold. As an example, the controller may determine if sufficient amount of moisture has been removed based on ambient humidity and duration of operation of the electric booster. It may be inferred that sufficient amount of moisture has been removed if the electric booster has been operated for a specific duration and/or if the ambient humidity has decreased to below the threshold humidity such that further condensation of moisture from ambient air may reduce. The specific duration of operation of the electric booster is determined in step 307 based on each of an ambient humidity, CAC condensate concentration, and engine temperature. In one example, operation of the electric booster for moisture removal may be continued until the subsequent engine start and following the engine start, the electric booster may be used for providing the desired boost pressure, as needed.

In one example, during conditions when a higher amount of condensate is present in the engine components (such as during higher ambient humidity conditions, rain showers), sufficient amount of moisture may not be removed prior to the engine start. The remaining amount of moisture that could not be removed before engine start may be removed by operating the electric booster during an immediately subsequent engine non-combusting condition, such as a deceleration fuel shut-off (DFSO) condition.

Method 300 may be carried out during higher than threshold humidity conditions irrespective of an actual moisture accumulation in the engine components. Removal of moisture may be carried out preemptively to remove any moisture that may have accumulated in the engine components during the vehicle-off condition. Also, the preemptive removal of moisture may be carried out to remove any condensate that may form in the engine components during the time that the engine will be cranked before fuel starts getting combusted. In this way, a vehicle may be operated with ambient humidity higher than a threshold; and responsive to the humidity higher than the non-zero threshold when the engine is not combusting, the engine may be rotated (spun) unfueled and an intake electric booster may be operated to route compressed air through an intake manifold and an exhaust manifold of the engine, thereby removing condensate from engine components prior to resuming fuel combustion in the engine.

FIG. 4 shows an example timeline 400 illustrating operation of an electric booster (electric booster) to remove water accumulated in engine components. The horizontal (x-axis) denotes time and the vertical markers t1-t7 identify significant times in the routine for operation of the electric booster.

The first plot, line 402, shows variation in vehicle speed over time. The second plot, line 404, shows whether the engine is operating fueled or unfueled. The engine may be rotated fueled with fuel being supplied to the engine cylinders via fuel injectors. The engine may also be rotated unfueled, such as on a deceleration, or via an electric machine coupled to the hybrid electric vehicle (HEV). The third plot, line 406, shows a position of an accelerator pedal which in representative of driver torque demand. The fourth plot, line 408, shows operation of the electric machine coupled to the HEV. The machine may be operated to provide motor torque to propel the HEV. The fifth plot, line 410, shows ambient humidity as estimated based on input from an ambient humidity sensor coupled to the engine intake manifold. Dashed line 411 shows a threshold humidity above which water from air may condense on engine components including the intake manifold. The sixth plot, line 412, shows a speed of operation of an electric booster (such as electric booster 155 in FIG. 1) coupled to a conduit parallel to the intake manifold downstream of an intake compressor and upstream of a charge air cooler (CAC). The seventh plot, line 414, shows opening of an intake throttle. The eighth plot, line 416, shows opening of an exhaust gas recirculation (EGR) valve coupled to an EGR passage, one end of the EGR passage coupled to the intake passage downstream of each of the electric booster and the CAC, and the other end of the EGR passage coupled to the exhaust passage upstream of an exhaust turbine.

Prior to time t1, the vehicle is keyed off and at rest and is not being propelled by engine torque or machine torque. Moisture in the air already present inside the engine components prior to the immediately previous engine shutdown may condense and accumulate within the engine components including the intake manifold, the exhaust manifold, and the engine cylinders. Since, the vehicle is parked in an area with a higher than threshold 411 ambient humidity, humid air may enter the engine exhaust manifold via the tailpipe and condense on engine components including the exhaust manifold. The intake throttle and the EGR valve are maintained in substantially closed positions.

At time t1, the controller receives a remote start request. Specifically, the controller receives a signal from a source external to the vehicle requesting vehicle start at time t2. In response to the scheduling of the vehicle key-on event at time t1, the controller sends a signal to an actuator coupled to the electric booster to operate the electric booster and flow pressurized air through the intake manifold. The controller may also actuate the intake throttle to a wide open position to allow ambient air to flow through the electric booster and into the intake manifold. At the electric booster, the ambient air that is drawn in is pressurized and there is an increase in charge air temperature. The pressurized air at the elevated temperature flows through the intake manifold including the CAC, thereby vaporizing the accumulated moisture from the intake manifold and the CAC. The controller also sends a signal to the electric machine at t1 to rotate the engine unfueled. As the engine is rotated, the compressed air along with the accumulated moisture from the intake manifold is routed to the exhaust manifold via the engine cylinders. Moisture accumulated in the cylinders may also be removed by the compressed air flowing through the engine. The compressed air then flows through the exhaust manifold vaporizing and removing any moisture accumulated in the exhaust passage. In this way, between time t1 and t2, prior to the actual vehicle key-on, the electric booster is operated to flow compressed air through the intake manifold, engine cylinders, and the exhaust manifold, thereby removing accumulated moisture from the engine components to the atmosphere via the tailpipe. By removing the accumulated moisture before an engine start event, duration of engine cranking may be reduced and the possibility of water ingestion and occurrences of misfire may also be reduced.

At time t2, the vehicle is started and the engine is operated fueled to propel the vehicle using engine torque. The controller sends a signal to the fuel injectors coupled to the engine cylinders to initiate fueling to the cylinders and combustion of air and fuel is commenced. The controller infers the torque demand based on the accelerator pedal position, and between time t2 and t3, based on the torque demand, the controller adjusts (herein reduces) the speed of operation of the electric booster to provide the desired boost pressure. Also, the controller sends a signal to the actuator coupled to the intake throttle to adjust the opening of the intake throttle proportional to the torque demand. During the engine combusting condition, between time t2 and t3, due to the heat produced from engine operation, even if the ambient humidity is higher than the threshold 411, moisture may not condense within the engine components. Also, as the engine is fueled, at time t2, the controller suspends operation of the electric machine as motor power is no longer needed to rotate the engine unfueled.

At time t3, in response to a tip-out condition, a decrease in torque demand is inferred. Due to the decreased torque demand, the controller sends a signal to the fuel injectors to disable fueling to the engine cylinders. Between time t3 and t4, the vehicle is in operation under a deceleration fuel shut-off (DFSO) condition. Due to the suspension of combustion, heat is no longer generated at the engine and the engine temperature may reduce to below the dew point temperature.

In response to the engine being operated under the prolonged DFSO condition during the prevalent higher than threshold humidity condition, at time t4, it is inferred that water from air present inside the engine intake manifold may condense and accumulate within the engine components.

Therefore, at time t4, the intake throttle opening is increased to a wide open position and the electric booster speed is increased. The air compressed by the electric booster is routed through the intake manifold to remove any accumulated moisture. At time t4, the EGR valve is fully opened to allow the compressed air to flow from the intake manifold to the exhaust manifold via the EGR passage. Between time t3 and t4, compressed air flows through each of the intake manifold, the EGR passage, the exhaust manifold, removing moisture from each of these components.

At time t5, as the vehicle enters a region with an even higher humidity such as due to rain showers, it is inferred that there may be an increase in condensate formation in the engine components during the prevalent DFSO (engine non-combusting) condition. Therefore, at time t5, the speed of operation of the electric booster is increased to increase the amount of pressurized air flowing through the engine components. Between time t5 and t6, due to the increase in the electric booster speed, the temperature of the compressed air increases, thereby further facilitating vaporization and removal of the accumulated condensate as the air stream flows through the intake manifold, the EGR passage, and the exhaust manifold.

At time t6, in response to a change in pedal position, an increase in torque demand is inferred. Between time t6 and t7, the engine is not rotated and the demanded torque is supplied by operating the electric machine. The humidity continues to be at a higher than threshold 411 level and the electric booster is continued to be operated to flow compressed air through the intake manifold, the EGR passage, and the exhaust manifold to remove the accumulated moisture.

At time t7, the vehicle enters a region of lower than threshold 411 humidity and it is inferred that condensation of moisture may no longer take place within the engine components. Also, at time t6, in response to a tip-in, an increase in torque demand is inferred and fueling to the engine is resumed. After time t6, due to heat generated by combustion, any remaining moisture in the intake manifold and exhaust manifold may be vaporized, thereby drying the engine components.

In this way, by operating the electric booster prior to an actual engine start, moisture accumulated in the engine intake manifold and the exhaust manifold may be removed, thereby reducing engine cranking time and improving driving experience. By removing water from the exhaust manifold prior to an engine start, heating of oxygen sensors may be expedited and water splashing on the oxygens sensors may be reduced, thereby improving accuracy of measurements and emissions quality. The technical effect of opportunistically using the electric booster to dry the intake manifold during engine non-combusting conditions is that during a subsequent combustion event, the possibility of water ingestion in the engine cylinders is reduced, thereby reducing occurrences of misfire. Overall, by drying the intake manifold and the exhaust manifold during engine non-combusting conditions, combustion stability may be increased, and emissions quality may be improved during an immediately subsequent engine combusting condition.

An example engine method for a hybrid vehicle comprises: operating the vehicle with ambient humidity higher than a threshold, and responsive to the humidity higher than the (non-zero) threshold, spinning an engine unfueled and operating an intake electric booster to route compressed air through an intake manifold and an exhaust manifold of the engine. In any preceding example, additionally or optionally, spinning the engine unfueled includes spinning the engine in a forward or default direction during an engine non-combusting condition. In any or all of the preceding examples, additionally or optionally, the engine is coupled in a vehicle and wherein the engine non-combusting condition includes one of a deceleration fuel shut-off condition, a vehicle key-off condition, and vehicle propulsion via machine torque only. In any or all of the preceding examples, the method further comprises, additionally or optionally, predicting an engine start based on driving history retrieved from an on-board database, and wherein the spinning the engine unfueled is responsive to the predicted engine start and before an actual engine start. In any or all of the preceding examples, the method further comprises, additionally or optionally, scheduling an engine start based on a signal received from a source external to the vehicle, and wherein the spinning the engine unfueled is responsive to the scheduled engine start. In any or all of the preceding examples, additionally or optionally, the electric booster is coupled to a conduit parallel to an intake passage, the conduit coupled to the intake passage downstream of an intake compressor and upstream of a charge air cooler, the method further comprising regulating air flow though the electric booster via an electric booster bypass valve coupled to the intake passage, downstream of the intake compressor. In any or all of the preceding examples, additionally or optionally, operating the electric booster includes closing the bypass valve to direct air charge into the conduit while adjusting a speed and duration of operation of the electric booster based on a difference between a measured ambient humidity and the threshold ambient humidity, the threshold ambient humidity is calibrated based on an estimated dew point temperature. In any or all of the preceding examples, additionally or optionally, the adjusting the speed and duration of operation of the electric booster is further based on an engine temperature and a condensate level of the charge air cooler, each of the speed of the electric booster and the duration of operation of the electric booster increasing with an increase in one or more of the difference and the charge air cooler condensate level, each of the speed of the electric booster and the duration of operation of the electric booster decreasing with an increase in the engine temperature. In any or all of the preceding examples, additionally or optionally, the electric booster includes a compressor driven by an electric motor, and adjusting the speed of the electric booster includes adjusting a speed of operation of the electric motor, the electric motor operated via an on-board energy storage device. In any or all of the preceding examples, the method further comprises, additionally or optionally, while closing the electric booster bypass valve, actuating an intake throttle coupled downstream of the charge air cooler to a wide open position to route compressed air from the electric booster into the intake manifold. In any or all of the preceding examples, additionally or optionally, the engine includes an exhaust gas recirculation passage coupling the exhaust manifold to the intake manifold, downstream of the electric booster, and wherein routing the compressed air via the intake manifold and the exhaust manifold further includes opening an exhaust gas recirculation valve coupled to the exhaust gas recirculation passage to flow compressed air exiting the electric booster to the exhaust manifold. In any or all of the preceding examples, additionally or optionally, the ambient humidity is measured via one or more of an intake humidity sensor, a windshield humidity sensor, or inferred based on weather data including ambient humidity conditions retrieved from an external network communicatively coupled to the vehicle via wireless communication.

Another engine example method comprises: during an engine off condition, predicting an upcoming engine-on event based on driver history, and responsive to the upcoming engine-on event occurring while ambient humidity is higher than a threshold, fully opening an intake throttle, spinning an engine unfueled via a motor, and spinning an intake electric booster via an actuator to route compressed ambient air through each of an intake manifold, engine cylinders, and an exhaust manifold of the engine for a duration based on the ambient humidity. In any preceding example, additionally or optionally, the driver history is retrieved from an on-board database and wherein the predicting is responsive to a remote key-on request received from a source external to the vehicle. In any or all of the preceding examples, additionally or optionally, the compressed air is routed from the electric booster to the intake manifold upon passage through a charge air cooler, and wherein the duration is further based on engine temperature and an amount of condensate accumulated in the charge air cooler, the duration increased as ambient humidity and the amount of condensate accumulated in the charge air cooler increases, the duration decreased as engine temperature increases. In any or all of the preceding examples, the method further comprises, additionally or optionally, opening an exhaust gas recirculation valve coupled to an exhaust gas recirculation (EGR) passage to route at least a portion of the compressed ambient air from the intake manifold to the exhaust manifold via the EGR passage, the EGR passage coupled to the intake manifold downstream of each of the charge air cooler and the electric booster.

In yet another example, a hybrid vehicle system comprises: a vehicle, an electric machine coupled to a battery for propelling the vehicle, an engine including one or more cylinders, an intake manifold, and an exhaust manifold, an intake passage including a compressor, a charge air cooler (CAC) downstream of the compressor, and an intake throttle downstream of the CAC, a conduit coupled to the intake passage downstream of the compressor and upstream of the CAC, the conduit including a motor-driven electric booster, an electric booster bypass valve coupled at a junction of the intake passage and the conduit, an accelerator pedal for receiving an operator torque demand, one or more sensors including each of an ambient humidity sensor and an intake air temperature sensor coupled to the intake manifold, and a rain sensor coupled to a vehicle windshield wiper, an exhaust gas recirculation (EGR) passage coupling the exhaust manifold to the intake manifold, downstream of the compressor, the EGR passage including an EGR valve, and a controller with computer readable instructions stored on non-transitory memory for: operating the engine in a first mode with the engine spinning fueled and an output of the electric booster adjusted based on torque demand, and operating the engine in a second mode with the engine spinning unfueled and the output of the electric booster adjusted based at least on ambient humidity. In any preceding example, additionally or optionally, the controller includes instructions for operating the engine in the first mode responsive to the torque demand being higher than a threshold while operating the compressor, and operating the engine in the second mode responsive to the ambient humidity being higher than a threshold humidity, the threshold humidity calibrated as a function of dew point temperature. In any or all of the preceding examples, additionally or optionally, operating in the second mode includes spinning the engine unfueled during a deceleration fuel shut-off event and opening the EGR valve, the output of the electric booster increased during operation in the second mode with an increase in ambient humidity to flow compressed air to the intake manifold, the one or more cylinders, and the exhaust manifold, at least a portion of the compressed air flowed from the intake manifold to the exhaust manifold via the EGR passage. In any or all of the preceding examples, additionally or optionally, the controller contains further instructions for: transitioning from the first mode to the second mode responsive to each of a suspension of fuel injection to the one or more engine cylinders, a decrease in engine temperature to below a threshold temperature, and an increase in ambient humidity to above a threshold humidity, wherein each of the threshold humidity and the threshold temperature is calibrated based on an estimated dew point temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a hybrid vehicle, comprising: responsive to a higher than threshold ambient humidity, spinning, via an electronic controller, the engine unfueled and operating, via the electronic controller, an intake electric booster to route compressed air through an intake manifold and an exhaust manifold of the engine.

2. The method of claim 1, wherein spinning the engine unfueled includes spinning the engine in a forward or default direction during an engine non-combusting condition.

3. The method of claim 2, wherein the engine is coupled in a vehicle and wherein the engine non-combusting condition includes one of a deceleration fuel shut-off condition, a vehicle key-off condition, and vehicle propulsion via machine torque only.

4. The method of claim 3, further comprising scheduling an engine start based on a signal received from a source external to the vehicle, and wherein the spinning the engine unfueled is responsive to the scheduled engine start.

5. The method of claim 3, wherein the ambient humidity is measured via one or more of an intake humidity sensor, a windshield humidity sensor, or inferred based on weather data including ambient humidity conditions retrieved from an external network communicatively coupled to the vehicle via wireless communication.

6. The method of claim 1, further comprising predicting an engine start based on driving history retrieved from an on-board database, and wherein the spinning the engine unfueled is responsive to the predicted engine start and before an actual engine start.

7. The method of claim 1, wherein the electric booster is coupled to a conduit parallel to an intake passage, the conduit coupled to the intake passage downstream of an intake compressor and upstream of a charge air cooler, the method further comprising regulating air flow though the electric booster via an electric booster bypass valve coupled to the intake passage, downstream of the intake compressor.

8. The method of claim 7, wherein operating the electric booster includes closing the electric booster bypass valve to direct air charge into the conduit while adjusting a speed and duration of operation of the electric booster based on a difference between a measured ambient humidity and the threshold ambient humidity, the threshold ambient humidity calibrated based on an estimated dew point temperature.

9. The method of claim 8, wherein the adjusting the speed and duration of operation of the electric booster is further based on an engine temperature and a condensate level of the charge air cooler, each of the speed of the electric booster and the duration of operation of the electric booster increasing with an increase in one or more of the difference and the charge air cooler condensate level, each of the speed of the electric booster and the duration of operation of the electric booster decreasing with an increase in the engine temperature.

10. The method of claim 8, wherein the electric booster includes a compressor driven by an electric motor, and adjusting the speed of the electric booster includes adjusting a speed of operation of the electric motor, the electric motor operated via an on-board energy storage device.

11. The method of claim 7, further comprising, while closing the electric booster bypass valve, actuating an intake throttle coupled downstream of the charge air cooler to a wide open position to route compressed air from the electric booster into the intake manifold.

12. The method of claim 1, wherein the engine includes an exhaust gas recirculation passage coupling the exhaust manifold to the intake manifold, downstream of the electric booster, and wherein routing the compressed air via the intake manifold and the exhaust manifold further includes opening an exhaust gas recirculation valve coupled to the exhaust gas recirculation passage to flow compressed air exiting the electric booster to the exhaust manifold.

13. A vehicle method, comprising:
during an engine off condition, predicting, via an electronic controller, an upcoming engine-on event based on driver history; and
responsive to the upcoming engine-on event occurring while ambient humidity is higher than a threshold, via the electronic controller,
fully opening an intake throttle;
spinning an engine unfueled via a motor; and
spinning an intake electric booster via an actuator to route compressed ambient air through each of an intake manifold, engine cylinders, and an exhaust manifold of the engine for a duration based on the ambient humidity.

14. The method of claim 13, wherein the driver history is retrieved from an on-board database and wherein the predicting is responsive to a remote key-on request received from a source external to the vehicle.

15. The method of claim 13, wherein the compressed air is routed from the electric booster to the intake manifold upon passage through a charge air cooler, and wherein the duration is further based on engine temperature and an amount of condensate accumulated in the charge air cooler, the duration increased as ambient humidity and the amount of condensate accumulated in the charge air cooler increases, the duration decreased as engine temperature increases.

16. The method of claim 13, further comprising opening an exhaust gas recirculation valve coupled to an exhaust gas recirculation (EGR) passage to route at least a portion of the compressed ambient air from the intake manifold to the exhaust manifold via the EGR passage, the EGR passage coupled to the intake manifold downstream of each of a charge air cooler and the electric booster.

\* \* \* \* \*